(12) United States Patent
Takebe et al.

(10) Patent No.: US 7,091,294 B2
(45) Date of Patent: Aug. 15, 2006

(54) FLUOROPOLYMER AND RESIST COMPOSITION

(75) Inventors: Yoko Takebe, Yokohama (JP); Masataka Eda, Yokohama (JP); Osamu Yokokoji, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 11/100,527

(22) Filed: Apr. 7, 2005

(65) Prior Publication Data

US 2005/0234206 A1 Oct. 20, 2005

(30) Foreign Application Priority Data

Apr. 14, 2004 (JP) ............................. 2004-118534

(51) Int. Cl.
*C08F 18/20* (2006.01)
*C08F 118/00* (2006.01)
*C08F 220/22* (2006.01)
*C08F 12/20* (2006.01)
*C08F 214/18* (2006.01)

(52) U.S. Cl. ...................... 526/245; 526/249; 427/553; 427/555

(58) Field of Classification Search ............... 526/245, 526/249; 427/553
See application file for complete search history.

(56) References Cited

U.S. PATENT DOCUMENTS 6,468,712 B1* 10/2002 Fedynyshyn ............. 430/270.1
6,737,215 B1* 5/2004 Dammel et al. ......... 430/270.1
6,818,258 B1* 11/2004 Kaneko et al. ............. 427/553

2005/0234206 A1 10/2005 Takebe et al.

FOREIGN PATENT DOCUMENTS

WO  WO 00/17712      3/2000
WO  WO 01/63362 A2   8/2001

OTHER PUBLICATIONS

Yoko Takebe, et al., "A New Monocyclic Fluoropolymer structure for 157-nm Photoresists", Proceedings of SPIE, vol. 5376, (2004), pp. 151-158.
U.S. Appl. No. 11/353,149, filed Feb. 14, 2006, Takebe et al.

* cited by examiner

*Primary Examiner*—David W. Wu
*Assistant Examiner*—Ives Wu
(74) *Attorney, Agent, or Firm*—Oblon, Spivak, McClelland, Maier & Neustadt, P.C.

(57) ABSTRACT

A fluoropolymer (A) having units derived from monomer units formed by cyclopolymerization of at least one fluorinated diene selected from a fluorinated diene represented by the formula (1) and a fluorinated diene represented by the formula (2), and units derived from monomer units formed by cyclopolymerization of a fluorinated diene represented by the formula (3):

$$CF_2=CFCF_2-C(CF_3)(OR^1)-CH_2CH=CH_2 \quad (1)$$

$$CF_2=CFCH_2-CH((CH_2)_nC(CF_3)_2(OR^1))-CH_2CH=CH_2 \quad (2)$$

$$CF_2=CFCH_2-CH(COOR^2)-CH_2CH=CH_2 \quad (3)$$

wherein $R^1$ represents a hydrogen atom, a blocked group of a hydroxyl group capable of being converted into a hydrogen atom by an acid, or a blocked carboxyl group-containing organic group capable of being converted into a carboxyl group-containing organic group by an acid, $R^2$ represents a hydrocarbon group having at most 20 carbon atoms, and n represents 0 or 1.

20 Claims, No Drawings

FLUOROPOLYMER AND RESIST COMPOSITION

BACKGROUND OF THE INVENTION

1. Field of the Invention

The present invention relates to a novel fluoropolymer and a resist composition. More particularly, it relates to a fluoropolymer for a chemical amplification type resist and a resist composition, useful for fine processing employing far ultraviolet rays such as KrF or ArF excimer laser, or vacuum ultraviolet rays such as $F_2$ excimer laser.

2. Discussion of Background

In recent years, along with the progress in fine circuit patterns in the process for producing semiconductor integrated circuits, a photoresist material having high resolution and high sensitivity is desired. As the circuit patterns become fine, a short wavelength of a light source for an exposure apparatus becomes essential. In an application to lithography employing an excimer laser of 250 nm or shorter, a polyvinyl phenol type resin, an alicyclic acrylic type resin, a polynorbornene type resin (e.g. WO01/63362) or a fluororesin (e.g. WO00/17712) has, for example, been proposed, but no adequate resolution and sensitivity, and high dry etching resistance at the same time, have been obtained.

SUMMARY OF THE INVENTION

It is an object of the present invention to provide a novel fluoropolymer and a resist composition which is particularly excellent in transparency to far ultraviolet rays such as KrF or ArF excimer laser or vacuum ultraviolet rays such as $F_2$ excimer laser and dry etching properties, as a chemical amplification type resist and which gives a resist pattern excellent in sensitivity, resolution, evenness, heat resistance, etc.

The present invention has been made to solve the above-described problems and provides the following fluoropolymer (A) and resist composition.

<1> A fluoropolymer (A) having units derived from monomer units formed by cyclopolymerization of at least one fluorinated diene selected from a fluorinated diene represented by the formula (1) and a fluorinated diene represented by the formula (2), and units derived from monomer units formed by cyclopolymerization of a fluorinated diene represented by the formula (3):

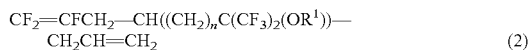

wherein $R^1$ represents a hydrogen atom, a blocked group of a hydroxyl group capable of being converted into a hydrogen atom by an acid, or a blocked carboxyl group-containing organic group capable of being converted into a carboxyl group-containing organic group by an acid, $R^2$ represents a hydrocarbon group having at most 20 carbon atoms, and n represents 0 or 1.

<2> The fluoropolymer (A) according to <1>, which has at least one type of a blocked acidic group selected from a blocked group of a hydroxyl group capable of being converted into a hydrogen atom by an acid, and a blocked carboxyl group-containing organic group capable of being converted into a carboxyl group-containing organic group by an acid.

<3> The fluoropolymer (A) according to <2>, which further has an acidic hydroxyl group.

<4> A resist composition comprising the fluoropolymer (A) as defined in any one of <1>, <2> and <3> which has a blocked acidic group, an acid-generating compound (B) which generates an acid under irradiation with light, and an organic solvent (C).

The fluoropolymer (A) of the present invention is a fluoropolymer having an alicyclic structure in its main chain and functional groups in side chains. The fluoropolymer (A) of the present invention has high chemical stability and heat resistance. Further, since it has functional groups introduced into its side chains, adequate characteristics of functional groups will be obtained without decrease in Tg, which has been difficult to achieve with a conventional fluoropolymer. Further, it has high transparency in a wide range of wavelength region. The resist composition of the present invention can be used as a chemical amplification type resist, it is particularly excellent in dry etching properties and transparency to far ultraviolet rays such as KrF or ArF excimer laser or vacuum ultraviolet rays such as $F_2$ excimer laser, and a resist pattern excellent in sensitivity, resolution, evenness, heat resistance, etc. can be easily formed with it.

DETAILED DESCRIPTION OF THE PREFERRED EMBODIMENTS

In the fluorinated diene represented by the formula (1) (hereinafter referred to as fluorinated diene (1)) and the fluorinated diene represented by the formula (2) (hereinafter referred to as fluorinated diene (2)), $R^1$ represents a hydrogen atom, a blocked group of a hydroxyl group capable of being converted into a hydrogen atom by an acid, or a blocked carboxyl group-containing organic group capable of being converted into a carboxyl group-containing organic group by an acid. Further, n in the fluorinated diene (2) represents 0 or 1. $R^1$ in the fluorinated diene (1) and $R^1$ in the fluorinated diene (2) may be groups different from each other.

In the present invention, the acidic group is a functional group showing acidity, such as a hydroxyl group showing acidity (such as phenolic hydroxyl group) or a carboxyl group. The hydroxyl group in the fluorinated dienes (1) and (2) wherein $R^1$ is a hydrogen atom, is an acidic hydroxyl group. The acidic group of which acidity is temporarily sealed is referred to as a blocked acidic group. The blocked acidic group is converted into an acidic group depending upon conditions. The blocked acidic group in the present invention is deblocked and converted into an acidic group under conditions where an acid is present.

In a case where $R^1$ is a blocked group of a hydroxyl group capable of being converted into a hydrogen atom by an acid, such $R^1$ may, for example, be an alkyl group which may be substituted by an aryl group or a cycloalkyl group, a cycloalkyl group, an alkoxymethyl group, an alkoxycarbonyl group, an alkoxycarbonylalkyl group, an acyl group or a cyclic ether. The cycloalkyl group may be a polycyclic cycloalkyl group such as a bridged polycycloalkyl group such as an adamantyl group or a connected polycycloalkyl group such as a bicyclohexyl group, and the alkyl group moiety in the alkoxy group in the above alkoxymethyl group or the like may be the above cycloalkyl group. Further, the above alkyl group may have an ethereal oxygen atom between carbon atoms (provided that the alkoxymethyl group is one type thereof). Further, the above aryl group or cycloalkyl group may have a substituent such as an alkyl group or an alkoxy group. The carbon number of such a blocked group is preferably from 1 to 30, particularly preferably from 2 to 20.

The alkyl group which may be substituted by an aryl group may, for example, be a tert-butyl group (t-$C_4H_9$), a benzyl group, a triphenylmethyl group, a p-methoxybenzyl group or a 3,4-dimethoxybenzyl group. The alkoxymethyl group may, for example, be a methoxymethyl group, an ethoxymethyl group, a (2-methoxyethoxy)methyl group or a benzyloxymethyl group, and the cyclic ether group may, for example, be a tetrahydropyranyl group (THP). Including the following alkoxymethyl group, the carbon number of such a blocked group is preferably from 2 to 20.

Further, the following may be mentioned as a blocked group wherein the alkyl group moiety in an alkoxy group of an alkoxymethyl group is a cycloalkyl group or a cycloalkyl-substituted alkyl group. They are represented in the form of —$OR^1$ so as to clarify the bonding position of $R^1$ and oxygen:

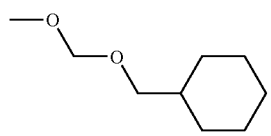

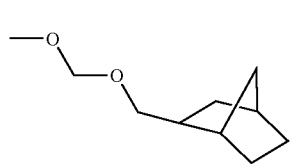
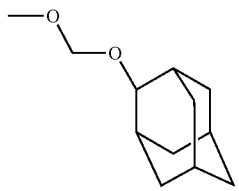

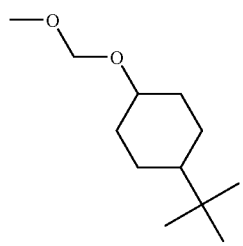

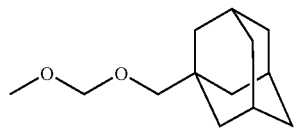

-continued

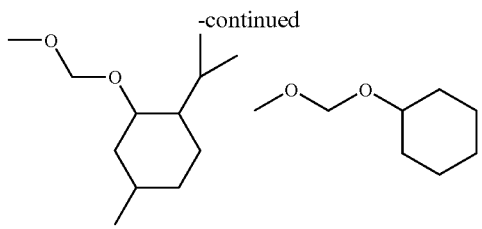

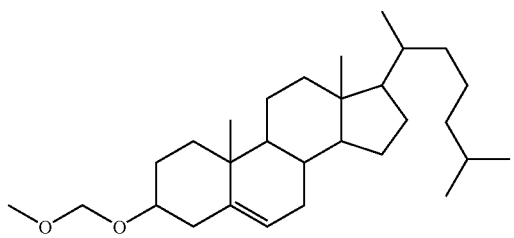

The above alkoxycarbonyl group as the blocked group may, for example, be a tert-butoxycarbonyl group (—COO(t-$C_4H_9$)). The above alkoxycarbonylalkyl group may, for example, be a tert-butoxycarbonylmethyl group (—$CH_2$COO(t-$C_4H_9$)). The above acyl group may, for example, be a pivaloyl group, a benzoyl group or an acetyl group. The carbon number of such a group is preferably from 2 to 20, particularly preferably from 2 to 10.

$R^1$ in the above formulae (1) and (2) may also be a blocked carboxyl group-containing organic group capable of being converted into a carboxyl group-containing organic group by an acid. The carboxyl group-containing organic group is preferably a group represented by —$R^3$—COOH. $R^3$ represents an alkylene group which may have an ethereal oxygen atom between carbon atoms, and its carbon number is preferably from 1 to 10, particularly preferably from 1 to 4. Most preferred $R^3$ is a methylene group. The blocked group of such a carboxyl group is preferably a hydrocarbon group, and the hydrocarbon group may have an ethereal oxygen atom between carbon atoms. The blocked group is preferably the above-mentioned alkyl group which may be substituted by an aryl group or a cycloalkyl group, or a cycloalkyl group. The carbon number of the hydrocarbon group as the blocked group is preferably from 1 to 20, particularly preferably from 2 to 15.

The blocked carboxyl group-containing organic group is preferably an alkoxycarbonylalkyl group, and the alkyl group moiety in the alkoxy group in this group may be the above-mentioned cycloalkyl group. Particularly preferred alkoxycarbonylalkyl group is an alkoxycarbonylmethyl group, and the alkyl group moiety in the alkoxy group is preferably a chain alkyl group having from 3 to 8 carbon atoms.

The alkoxycarbonylmethyl group may be deblocked so that $R^1$ is a hydrogen atom, or may be deblocked so that $R^1$ is a hydroxycarbonylmethyl group (—$CH_2$—COOH) depending upon deblocking conditions. In the former case, the entire alkoxycarbonylmethyl group may be considered as a blocked group of a hydroxyl group.

$R^1$ is preferably at least one member selected from the group consisting of a hydrogen atom, an alkyl group having at most 15 carbon atoms, an alkoxymethyl group having at most 15 carbon atoms, an alkoxycarbonylmethyl group having at most 8 carbon atoms and a tetrahydropyranyl group (including a case where the alkyl group or the alkyl group moiety is the above cycloalkyl group). Further, it is preferably at least one member selected from the group consisting of a hydrogen atom, a methoxymethyl group, an ethoxymethyl group, a 2-cyclohexylcyclohexyloxymethyl group, a tert-butoxycarbonylmethyl group and a tetrahydropyranyl group.

In the polymer containing monomer units of the fluorinated diene (1) may contain at least two types of the monomer units, and the same applies to the fluorinated diene (2) and the fluorinated diene (3). Namely, a polymer may be produced by using at least two types of the fluorinated dienes (1). For example, when at least two types having different $R^1$ are used as the fluorinated dienes (1), specifically, a combination of a fluorinated diene (1) wherein $R^1$ is a methoxymethyl group (—CH$_2$OCH$_3$) and a fluorinated diene (1) wherein $R^1$ is a tert-butoxycarbonyl group (—C(O)O(t-C$_4$H$_9$)), a combination of a fluorinated diene (1) wherein $R^1$ is a methoxymethyl group and a fluorinated diene (1) wherein $R^1$ is a tert-butoxycarbonylmethyl group (—CH$_2$C(O)O(t-C$_4$H$_9$)), a combination of a fluorinated diene (1) wherein $R^1$ is an ethoxymethyl group (—CH$_2$OCH$_2$CH$_3$) and a fluorinated diene (1) wherein $R^1$ is a tert-butoxycarbonyl group, or a combination of a fluorinated diene (1) wherein $R^1$ is an ethoxymethyl group and a fluorinated diene (1) wherein $R^1$ is a tert-butoxycarbonylmethyl group, may, for example, be mentioned.

In order to block a hydroxyl group or carboxy group into a blocked hydroxyl group or a blocked carboxy group, a blocking agent is reacted with a hydroxyl group or a carboxy group. As the blocking agent and the reaction method, known ones may be employed. Further, an active derivative having a blocked carboxyl group-containing organic group as a blocking agent for a hydroxyl group may be reacted with a hydroxyl group. A compound wherein $R^1$ formed by the reaction is a blocked carboxyl group-containing organic group may undergo deblocking so that $R^1$ is converted into a carboxyl group-containing organic group in some cases.

For example, in order to block a hydroxyl group, a hydroxyl group is reacted with a blocking agent such as a carboxylic acid or an active derivative thereof. Such an active derivative may, for example, be an alkyl halide, an acid chloride, an acid anhydride, a chlorocarbonate, a bromocarbonate, a dialkyl dicarbonate (such as di-tert-butyl dicarbonate) or 3,4-dihydro-2H-pyran. Specific examples of blocking agents useful for blocking a hydroxyl group are disclosed in A. J. Pearson and W. R. Roush, Handbook of Reagents for Organic Synthesis: Activating Agents and Protecting Groups, John Wiley & Sons (1999).

Further, blocking may be carried out after formation of a polymer. A fluorodiene (1) or (2) wherein $R^1$ is a hydrogen atom may be subjected to cyclopolymerization and formed into a polymer, and then the hydroxyl groups or carboxyl groups in the side chains of the polymer may be blocked by the above blocking agent. However, a polymer having free carboxyl groups has a high solubility in an alkali and it is usually difficult to block the carboxyl groups with a sufficiently high proportion to lower the solubility in an alkali, and thus it is not preferred to polymerize a monomer having a free carboxy group and to block free carboxy groups after polymerization. Thus, as the fluorinated diene (1) or (2), a compound having substantially no free carboxyl group is used as a monomer. Further, the fluorinated diene (3) may also be considered as a blocked carboxyl group-containing compound having substantially no free carboxyl group.

Further, as the case requires, a polymer is formed and then part of blocked acidic groups may be deblocked to produce a polymer having free acidic groups. The deblocking may be carried out for the purpose of e.g. adjusting the proportion of the blocked acidic groups and the acidic groups as described hereinafter, or converting the blocked groups in the polymer into other blocked groups (blocking is further carried out after deblocking). The deblocking is carried out preferably on blocked acidic hydroxyl groups. Deblocking of the acidic hydroxyl groups may be carried out by a known method.

In the fluorinated diene (3) represented by the above formula (3), $R^2$ represents a hydrocarbon group having at most 20 carbon atoms. The hydrocarbon group having at most 20 carbon atoms is preferably the above-mentioned alkyl group which may have an ethereal oxygen atom, an aryl group, a cycloalkyl group or the like, or the above-mentioned cycloalkyl group. Part of hydrogen atoms in such a group may be substituted by fluorine atoms. An alkyl group having no ring is preferably an alkyl group having at most 6 carbon atoms, and an alkyl group having a ring is preferably an alkyl group having from 6 to 20 carbon atoms. The cycloalkyl group is preferably a cycloalkyl group having at most 20 carbon atoms. The alkyl group is preferably a chain alkyl group having no substituent, and the chain alkyl group may be a straight chain alkyl group or a branched alkyl group. The cycloalkyl group is preferably a 5- to 6-membered monocyclic cycloalkyl group, a bridged bicycloalkyl group, a bridged tricycloalkyl group or a connected bicycloalkyl group, and such a cycloalkyl group may have an alkyl group bonded thereto. The carbon number of such a cycloalkyl group is preferably from 5 to 15.

The above alkyl group having no ring may, for example, be a straight chain alkyl group such as a methyl group, an ethyl group, a propyl group or a butyl group, or a branched alkyl group such as an isopropyl group or a tert-butyl group. The following may be mentioned as the above cycloalkyl group. They are represented in the form of —OR$^2$ so as to clarify the bonding position of $R^2$ and oxygen:

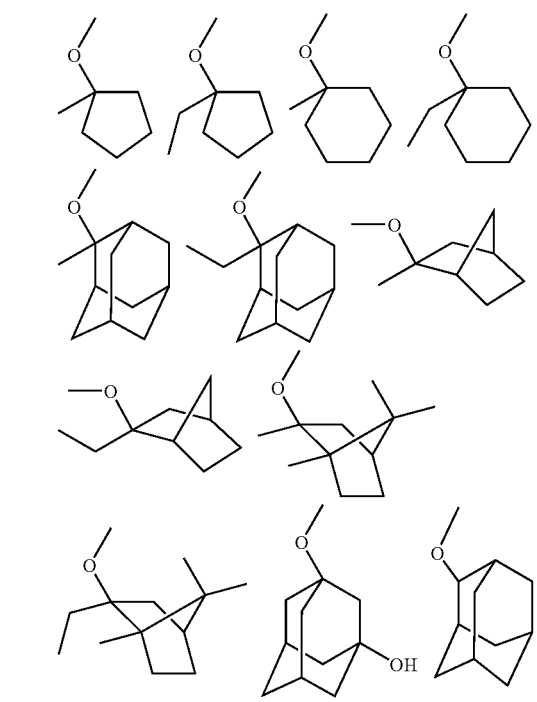

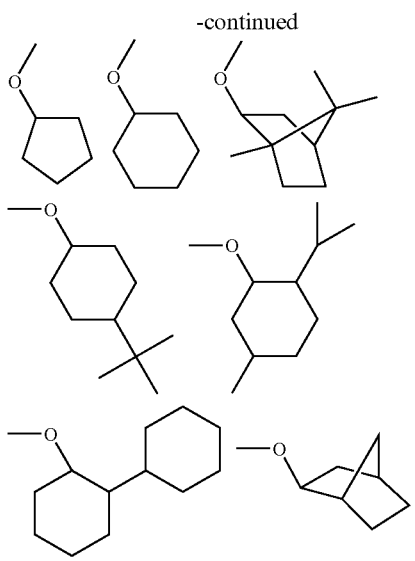

In $R^2$, the carbon atom which is bonded to oxygen is preferably a secondary carbon atom (including a carbon atom constituting a ring of a cycloalkyl group) or a tertiary carbon atom (including a carbon atom constituting a ring of a polycycloalkyl group) so that $R^2$ is more likely to be converted into a hydrogen atom by an acid. It is particularly preferred that the carbon atom which is bonded to oxygen is a tertiary carbon atom of e.g. a tert-butyl group. $R^2$ wherein the carbon atom which is bonded to oxygen is a tertiary carbon atom is particularly preferably at least one member selected from the group consisting of a tert-butyl group, a 1-ethylcyclopent-1-yl group, a 1-methylcyclohex-1-yl group and a 2-methyladamant-2-yl group.

It is considered that the following monomer units (a), (b) and (c) form by cyclopolymerization of the fluorinated diene (1), and that from results of spectroscopic analysis, a cyclopolymerized product of the fluorinated diene (1) is a polymer having a structure containing the monomer units (a), the monomer units (b) or both as main monomer units. The main chain of the cyclopolymerized product is a carbon chain composed of carbon atoms constituting a polymerizable unsaturated bond (four carbon atoms constituting polymerizable unsaturated bonds in the case of the fluorinated diene (1)).

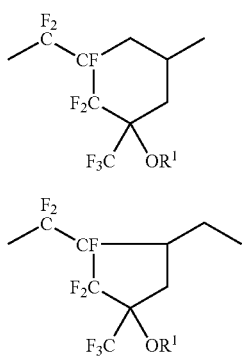

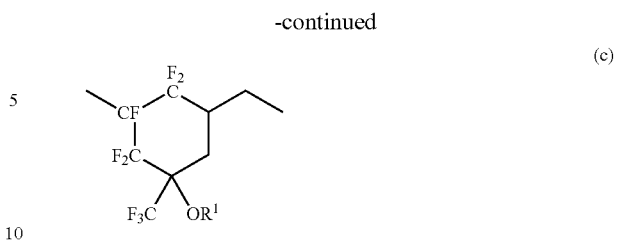

It is considered that the following monomer units (d), (e) and (f) form by cyclopolymerization of the fluorinated diene (2), and that from results of spectroscopic analysis, a cyclopolymerized product of the fluorinated diene (2) is a polymer having a structure containing the monomer units (e), the monomer units (f) or both as main monomer units. The main chain of the cyclopolymerized product is a carbon chain composed of carbon atoms constituting a polymerizable unsaturated bond (four carbon atoms constituting polymerizable unsaturated bonds in the case of the fluorinated diene (2)).

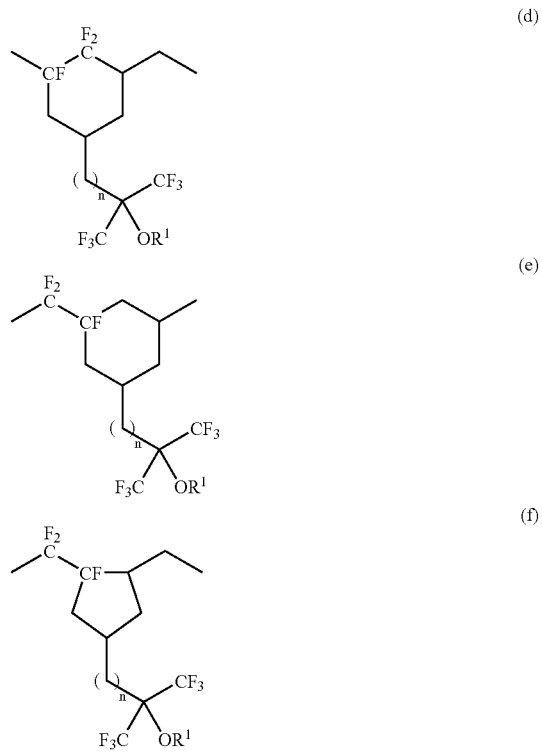

It is considered that the following monomer units (g), (h) and (i) form by cyclopolymerization of the fluorinated diene (3), and that from results of spectroscopic analysis, a cyclopolymerized product of the fluorinated diene (3) is a polymer having a structure containing the monomer units (h), the monomer units (i) or both as main monomer units. The main chain of the cyclopolymerized product is a carbon chain composed of carbon atoms constituting a polymerizable unsaturated bond (four carbon atoms constituting polymerizable unsaturated bonds in the case of the fluorinated diene (3)).

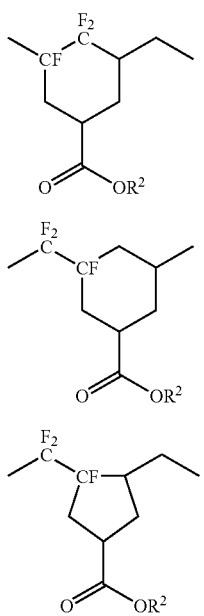

(g)
(h)
(i)

The fluoropolymer (A) of the present invention is a fluoropolymer having units derived from monomer units formed by cyclopolymerization of at least one fluorinated diene selected from the fluorinated diene (1) and the fluorinated diene (2), and units derived from monomer units formed by cyclopolymerization of the fluorinated diene (3). In the present invention, units derived from monomer units mean monomer units themselves or units obtained by chemical conversion of the monomer units after polymerization. For example, monomer units formed by cyclopolymerization of the fluorinated diene (1) or (2) wherein $R^1$ is a hydrogen atom may be converted into units wherein $R^1$ is a blocked group of a hydroxyl group, by blocking the hydroxyl groups in the monomer units after polymerization. Similarly, monomer units wherein $R^1$ is a blocked group of a hydroxyl group may be converted into units wherein $R^1$ is a hydrogen atom. The units derived from monomer units are not limited thereto, and mean units formed by blocking of an acidic group such as a carboxyl group, deblocking of a blocked acidic group and other chemical conversion of the monomer units.

Hereinafter, units derived from the monomer units formed by cyclopolymerization of the fluorinated diene (1) will be referred to as units (1), units derived from the monomer units formed by cyclopolymerization of the fluorinated diene (2) will be referred to as units (2), and units derived from the monomer units formed by cyclopolymerization of the fluorinated diene (3) will be referred to as units (3). As mentioned above, these units mean the monomer units themselves also.

The fluoropolymer (A) of the present invention may, for example, be a copolymer containing units (1) and units (3) (hereinafter referred to as unit (1)/unit (3) copolymer, the same applies hereinafter), a unit (2)/unit (3) copolymer or a unit (1)/unit (2)/unit (3) copolymer. Further, the fluoropolymer (A) may contain units derived from monomer units derived from another radical polymerizable monomer (hereinafter referred to as another monomer) (hereinafter referred to as units (4)) within a range not to impair the characteristics. Two or more types of the units (4) may be present.

Such a fluoropolymer (A) may, for example, be a unit (1)/unit (3)/unit (4) copolymer or a unit (2)/unit (3)/unit (4) copolymer.

In the fluoropolymer (A) of the present invention, the proportion of the total of the units (1) and the units (2) based on the total of the units (1), the units (2) and the units (3), is not particularly limited, but is preferably from 50 to 95 mol %. When the proportion of the total of the units (1) and the units (2) is at least 50%, a polymer having high transmission of particularly short wavelength ultraviolet rays (an excimer laser beam having a wavelength of at most 250 nm) will be obtained, and when the proportion of the units (3) is at least 5 mol %, development properties will improve when the fluoropolymer is used for a resist composition. Here, the proportion of the units (1) and the units (2) in the fluoropolymer (A) containing both units is not limited since only either the units (1) or the units (2) have to be contained in the fluoropolymer (A) as mentioned above.

As mentioned above, the fluoropolymer (A) may contain the units (4) within a range not to impair the characteristics. The proportion of the units (4) is preferably at most 30 mol %, particularly preferably at most 15 mol %, based on the whole units.

Said another monomer may, for example, be a monomer such as an α-olefin such as ethylene, propylene or isobutylene, a fluorinated olefin such as tetrafluoroethylene or hexafluoropropylene, a fluorinated vinyl ether such as perfluoropropyl vinyl ether, a fluorinated cyclic monomer such as perfluoro(2,2-dimethyl-1,3-dioxole, a cyclopolymerizable perfluorodiene such as perfluoro(butenyl vinyl ether), a vinyl ester such as vinyl acetate, vinyl pivalate, vinyl benzoate or vinyl adamantate, a vinyl ether such as ethyl vinyl ether or cyclohexyl vinyl ether, a cyclic olefin such as cyclohexene, norbornene or norbornadiene, a crotonate such as methyl crotonate, a cinnamate such as methyl cinnamate, maleic anhydride, vinyl chloride or styrene.

The fluoropolymer (A) of the present invention may have acidic groups or blocked acidic groups in the units (4). The acidic groups are preferably acidic hydroxyl groups. By the units (4) having acidic groups or blocked acidic groups, the solubility of the resist material can be controlled widely. The units (4) having acidic groups or blocked acidic groups may be obtained, for example, by copolymerizing another monomer having an acidic group or a blocked acidic group with the fluorinated diene (1) or (2) and the fluorinated diene (3). Further, they may be formed by converting such monomer units in the copolymer.

It is preferred that in the fluoropolymer (A) of the present invention as a resin material for a resist, blocked acidic groups and non-blocked acidic groups (free acidic groups) coexist. The blocked acidic groups mean not only blocked hydroxyl groups, blocked carboxyl groups and the like in the units (1), (2) and (4) but also —$COOR^2$ in the units (3). By changing the proportion of the blocked acidic groups and the free acidic groups in the fluoropolymer (A), when the fluoropolymer (A) is used for a resist composition, solubility of a resist film formed from the resist composition in an alkali developer can be controlled. The proportion of the blocked acidic groups to the total of the blocked acidic groups and the free acidic groups (hereinafter referred to as proportion of blocked groups) in the fluoropolymer (A) is preferably from 5 to 95 mol %, particularly preferably from 10 to 60 mol %. The free acidic groups in the fluoropolymer (A) are preferably composed mainly of acidic hydroxyl groups, and it is particularly preferred that substantially all the free acidic groups are acidic hydroxyl groups.

On the other hand, when a polymer is formed by using the fluorinated dienes (1), (2), (3) and the like, the proportion of the blocked acidic groups and the free acidic groups in the whole monomers may be out of the above range. For example, even when the proportion of the blocked acidic groups based on the total of the blocked acidic groups and the free acidic groups in the whole monomers is 100 mol %, a fluoropolymer (A) having blocked acidic groups in a proportion within the above range can be obtained by deblocking part of the blocked acidic groups after polymerization. The proportion of the blocked acidic groups in the whole monomers is preferably high since it may be difficult to adjust the proportion of blocked groups to a predetermined proportion after polymerization, if the proportion of monomers having acidic groups is high.

The proportion of the blocked acidic groups based on the total of the blocked acidic groups and the free acidic groups in the whole monomers is preferably from 5 to 100 mol %, particularly preferably from 10 to 90 mol %. When any of the monomers has an acidic group, the acidic group is preferably an acidic hydroxyl group. When monomers including an acidic hydroxyl group-containing monomer and a blocked acidic hydroxyl group-containing monomer is polymerized, the proportion of the blocked acidic hydroxyl group-containing monomer based on the total of both monomers is preferably from 5 to 100 mol %, particularly preferably from 10 to 90 mol %. On the other hand, use of a monomer having a free carboxyl group is unfavorable, and even if it is used, the proportion of such a monomer based on the whole monomers is preferably at most 15 mol %.

The molecular weight of the fluoropolymer (A) of the present invention is not particularly limited so long the fluoropolymer (A) is uniformly dissolved in an organic solvent as described hereinafter and uniformly coated on a substrate. However, the number average molecular weight as calculated as polystyrene is suitably from 1,000 to 100,000, preferably from 2,000 to 50,000. When the number average molecular weight is at least 1,000, when the fluoropolymer is used for a resist composition, more favorable resist pattern will be obtained, the film-remaining rate after development will be sufficient, and the shape stability at the time of pattern heat treatment will be more favorable. Further, when the number average molecular weight is at most 100,000, coating properties of a resist composition will be more favorable, and sufficient development properties will be maintained.

A fluoropolymer (A) or a precursor thereof (polymer before chemical conversion) will be obtained by copolymerizing at least one of the fluorinated dienes (1) and (2) and the fluorinated diene (3), or copolymerizing them with another optional monomer, in the presence of a polymerization initiator. The polymerization initiator is not particularly limited so long as it is capable of letting the polymerization reaction proceed radically, and it may, for example, be a radical-generating agent, light or ionizing radiation. A radical-generating agent is particularly preferred, and it may, for example, be a peroxide, an azo compound or a persulfate. The following peroxides are especially preferred:

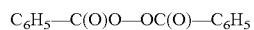

$C_6H_5$—C(O)O—OC(O)—$C_6H_5$

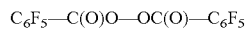

$C_6F_5$—C(O)O—OC(O)—$C_6F_5$

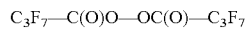

$C_3F_7$—C(O)O—OC(O)—$C_3F_7$

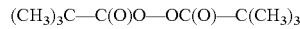

$(CH_3)_3C$—C(O)O—OC(O)—$C(CH_3)_3$

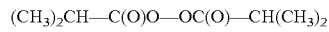

$(CH_3)_2CH$—C(O)O—OC(O)—$CH(CH_3)_2$

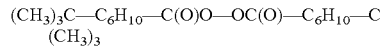

$(CH_3)_3C$—$C_6H_{10}$—C(O)O—OC(O)—$C_6H_{10}$—$C(CH_3)_3$

In the above, $C_6H_{10}$ represents a cyclohexylene group.

The polymerization method is also not particularly limited, and it may, for example, be so-called bulk polymerization wherein a monomer is subjected to polymerization as it is, solution polymerization which is carried out in a fluorohydrocarbon, a chlorohydrocarbon, a fluorochlorohydrocarbon, an alcohol, a hydrocarbon or other organic solvent, in which the monomer is dissolved, a suspension polymerization which is carried out in an aqueous medium in the absence or presence of a suitable organic solvent, or emulsion polymerization which is carried out in an aqueous medium in the presence of an emulsifier.

The fluoropolymer (A) in the resist composition of the present invention has blocked acidic groups as essential components. Namely, a fluoropolymer (A) having blocked acidic groups, such as monomer units wherein $R^1$ is a blocked group of a hydroxyl group or a blocked carboxyl group-containing organic group, as at least part of the units (1) or (2), monomer units wherein $R^2$ is a hydrocarbon group having at most 20 carbon atoms, as at least part of the units (3), or blocked acidic groups formed by e.g. blocking after polymerization, is used for a resist composition. The type of the blocked acidic groups, the content of the blocked acidic groups, the proportion of the blocked acidic groups and the free acidic groups, etc. in the fluoropolymer (A) to be used for a resist composition are preferably as mentioned above.

In the resist composition of the present invention, the acid-generating compound (B) which generates an acid under irradiation with light, will generate an acid upon exposure. By this acid, the blocked acidic groups present in the fluoropolymer (A) will be converted into acidic groups. As a result, the exposed portions of the resist film will be readily soluble in an alkaline developer, and a positive resist pattern will be formed by an alkaline developer. As such an acid-generating compound (B) which generates an acid under irradiation with light, it is possible to employ an acid-generating compound which is commonly used for a chemical amplification type resist material. Namely, an onium salt, a halogenated compound, a diazoketone compound, a sulfone compound or a sulfonic compound, may, for example, be mentioned. The following may be mentioned as examples of such an acid-generating compound (B).

The onium salt may, for example, be an iodonium salt, a sulfonium salt, a phosphonium salt, a diazonium salt or a pyridinium salt. Specific examples of a preferred onium salt include diphenyliodonium triflate, diphenyliodonium pyrenesulfonate, diphenyliodonium dodecylbenzenesulfonate, bis(4-tert-butylphenyl)iodonium triflate, bis(4-tert-butylphenyl)iodonium dodecylbenzenesulfonate, triphenylsulfonium triflate, triphenylsulfonium nonanate, triphenylsulfonium perfluorooctanesulfonate, triphenylsulfonium hexafluoroantimonate, 1-(naphthylacetomethyl)thioranium triflate, cyclohexylmethyl(2-oxocyclohexyl)sulfonium triflate, dicyclohexyl(2-oxocyclohexyl)sulfonium triflate, dimethyl(4-hydroxynaphthyl)sulfonium tosylate, dimethyl(4-hydroxynaphthyl)sulfonium dodecylbenzenesulfonate, dimethyl(4-hydroxynaphthyl)sulfoniumnaphthalene sulfonate, triphenylsulfonium camphorsulfonate and (4-hydroxyphenyl)benzylmethylsulfonium toluenesulfonate.

The halogenated compound may, for example, be a haloalkyl group-containing hydrocarbon compound or a haloalkyl group-containing heterocyclic compound. Specifically, it may, for example, be a (trichloromethyl)-s-triazine derivative such as phenyl-bis(trichloromethyl)-s-triazine, methoxyphenyl-bis(trichloromethyl)-s-triazine or naphthyl-bis(trichloromethyl)-s-triazine, or 1,1-bis(4-chlorophenyl)-2,2,2-trichloroethane.

The sulfone compound may, for example, be β-ketosulfone, β-sulfonylsulfone or an α-diazo compound of such a compound. Specifically, it may, for example, be 4-trisphenacylsulfone, mesitylphenacylsulfone or bis(phenylsulfonyl)methane. The sulfonic compound may, for example, be an alkylsulfonic acid ester, an alkylsulfonic acid imide, a haloalkylsulfonic acid ester, an arylsulfonic acid ester or an iminosulfonate. Specifically, it may, for example, be benzoin tosylate or 1,8-naphthalene dicarboxylic acid imide triflate. In the present invention, such acid-generating compounds (B) may be used alone or in combination as a mixture of two or more of them.

In the resist composition of the present invention, the organic solvent (C) is not particularly limited so long as it is capable of dissolving both components (A) and (B). It may, for example, be an alcohol such as methyl alcohol or ethyl alcohol, a ketone such as acetone, methyl isobutyl ketone or cyclohexanone, an acetate such as ethyl acetate or butyl acetate, an aromatic hydrocarbon such as toluene or xylene, a glycol monoalkyl ether such as propylene glycol monomethyl ether or propylene glycol monoethyl ether, or a glycol monoalkyl ether ester such as propylene glycol monomethyl ether acetate or carbitol acetate.

The proportions of the respective components in the resist composition of the present invention are usually such that per 100 parts by mass of the fluoropolymer (A), the acid-generating compound (B) is from 0.1 to 20 parts by mass, and the organic solvent (C) is from 50 to 2,000 parts by mass. Preferably, per 100 parts by mass of the fluoropolymer (A), the acid-generating compound (B) is from 0.1 to 10 parts by mass, and the organic solvent (C) is from 100 to 1,000 parts by mass.

By adjusting the amount of the acid-generating compound (B) to be at least 0.1 part by mass, it is possible to provide a sufficient sensitivity and developability, and by adjusting it to be at most 10 parts by mass, the transparency to radiation can be sufficiently maintained, whereby an accurate resist pattern can be obtained.

To the resist composition of the present invention, an acid-cleavable additive to improve the pattern contrast, a surfactant to improve the coating property, a nitrogen-containing basic compound to adjust the acid-generating pattern, an adhesion-assisting agent to improve the adhesion to the substrate or a storage stabilizer to increase the storage stability of the composition, may, for example, be optionally incorporated. Further, the resist composition of the present invention is preferably employed in such a manner that the respective components are uniformly mixed, followed by filtration by means of a filter of from 0.1 to 2 μm.

The resist composition of the present invention is coated on a substrate such as a silicone wafer, followed by drying to form a resist film. As the coating method, spin coating, cast coating or roll coating may, for example, be employed. The formed resist film will be irradiated with light via a mask having a pattern drawn thereon, followed by development treatment to form the pattern.

The light beams for the irradiation may, for example, be ultraviolet rays such as g-line having a wavelength of 436 nm or i-line having a wavelength of 365 nm, or far ultraviolet rays or vacuum ultraviolet rays, such as KrF excimer laser having a wavelength of 248 nm, ArF excimer laser having a wavelength of 193 nm or $F_2$ excimer laser having a wavelength of 157 nm. The resist composition of the present invention is a resist composition useful for an application where ultraviolet rays having a wavelength of at most 250 nm, especially ultraviolet rays having a wavelength of at most 200 nm (such as ArF excimer laser beam or $F_2$ excimer laser beam), are used as the light source. In addition, the resist composition of the present invention is a resist composition applicable to exposure employing so-called immersion technique wherein improvement in resolution is attempted utilizing the degree of the refractive index of water, an organic compound containing a fluorine atom, or the like.

As the development treatment solution, various alkali aqueous solutions are employed. As such alkali, sodium hydroxide, potassium hydroxide, ammonium hydroxide, tetramethyl ammonium hydroxide or triethylamine may, for example, be mentioned.

EXAMPLES

Now, the present invention will be described in further detail with reference to Examples. However, it should be understood that the present invention is by no means restricted by such specific Examples.

Abbreviations used in the following Examples are as follows.

THF: tetrahydrofuran, AIBN: azobisisobutyronitrile, BPO: benzoyl peroxide, PSt: polystyrene, R225: dichloropentafluoropropane (solvent), IPP: diisopropyl peroxydicarbonate, 2-MeAd: 2-methyladamant-2-yl group.

Preparation Example 1-1

Preparation of $CF_2=CFCF_2C(CF_3)(OH)CH_2CH=CH_2$

Into a 2 L reactor made of glass, 108 g of $CF_2ClCFClCF_2C(O)CF_3$ and 500 ml of dehydrated THF were charged and cooled to 0° C. A diluted solution having 200 ml of a 2M THF solution of $CH_2=CHCH_2MgCl$ further diluted with 200 ml of dehydrated THF, was dropwise added thereto in a nitrogen atmosphere over a period of about 5.5 hours. After completion of the dropwise addition, the mixture was stirred at 0° C. for 30 minutes and at room temperature for 17 hours, whereupon 200 ml of 2N hydrochloric acid was dropwise added. 200 ml of water and 300 ml of diethyl ether were added for liquid separation, and a diethyl ether layer was obtained as an organic layer. The organic layer was dried over magnesium sulfate, followed by filtration to obtain a crude liquid. The crude liquid was concentrated by an evaporator, followed by distillation under reduced pressure to obtain 85 g of $CF_2ClCFClCF_2C(CF_3)(OH)CH_2CH=CH_2$ (60 to 66° C./0.7 kPa).

Then, into a 500 ml reactor made of glass, 81 g of zinc and 170 ml of dioxane were charged, and activation of zinc was carried out by iodine. The reactor was heated to 100° C., and a solution prepared by diluting 84 g of the above prepared $CF_2ClCFClCF_2C(CF_3)(OH)CH_2CH=CH_2$ with 50 ml of dioxane, was dropwise added thereto over a period of 1.5 hours. After completion of the dropwise addition, the mixture was stirred at 100° C. for 40 hours. The reaction solution was filtered and washed with a small amount of dioxane. The filtrate was distilled under reduced pressure to obtain 30 g of $CF_2=CFCF_2C(CF_3)(OH)CH_2CH=CH_2$ (36 to 37° C./1 kPa, hereinafter referred to as monomer 1-1).

NMR Spectra of the Monomer 1-1

$^1$H-NMR (399.8 MHz, solvent: $CDCl_3$, standard: tetramethylsilane) δ (ppm): 2.74 (d, J=7.3, 2H) 3.54 (broad s, 1H), 5.34 (m, 2H), 5.86 (m, 1H).

$^{19}$F-NMR (376.2 MHz, solvent: CDCl$_3$, standard: CFCl$_3$) δ (ppm): −75.7 (m, 3F), −92.2 (m, 1F), −106.57 (m, 1F), −112.6 (m, 2F), −183.5 (m, 1F).

Preparation Example 1-2

Preparation of CF$_2$=CFCF$_2$C(CF$_3$)(OCH$_2$OCH$_3$)CH$_2$CH=CH$_2$

Into a 10 L reactor made of glass, 758 g of CF$_2$ClCFClCF$_2$C(O)CF$_3$ and 4.5 L of dehydrated THF were charged and cooled to 0° C. 1.4 L of a 2M THF solution of CH$_2$=CHCH$_2$MgCl, was dropwise added thereto in a nitrogen atmosphere over a period of about 10.5 hours. After completion of the dropwise addition, the mixture was stirred at 0° C. for 30 minutes and at room temperature for 12 hours, whereupon 350 g of chloromethyl methyl ether was dropwise added. The mixture was further stirred at room temperature for 92 hours. 1.5 L of water was added, followed by liquid separation. The organic layer was concentrated by an evaporator, and the obtained crude liquid was washed twice with water of 1.5 L. Then, distillation under reduced pressure was carried out to obtain 677 g of CF$_2$ClCFClCF$_2$C(CF$_3$)(OCH$_2$OCH$_3$)CH$_2$CH=CH$_2$ (53 to 55° C./0.17 kPa).

Then, into a 3 L reactor made of glass, 577 g of zinc and 1.3 L of dioxane were charged, and activation of zinc was carried out by iodine. Then, the reactor was heated to 100° C., and 677 g of the above prepared CF$_2$ClCFClCF$_2$C(CF$_3$)(OCH$_2$OCH$_3$)CH$_2$CH=CH$_2$ was dropwise added thereto over a period of 2 hours. After completion of the dropwise addition, the mixture was stirred at 100° C. for 47 hours. The reaction solution was filtered and washed with a small amount of dioxane. To the filtrate, 2.5 L of water and 1.5 L of diethyl ether were added, followed by liquid separation. The organic layer was dried over anhydrous magnesium sulfate, followed by filtration to obtain a crude liquid. The crude liquid was concentrated by an evaporator, followed by distillation under reduced pressure to obtain 177 g of CF$_2$=CFCF$_2$C(CF$_3$)(OCH$_2$OCH$_3$)CH$_2$CH=CH$_2$ (43 to 45° C./0.6 kPa, hereinafter referred to as monomer 1-2).

NMR Spectra of the Monomer 1-2:
$^1$H-NMR (399.8 MHz, solvent: CDCl$_3$, standard: tetramethylsilane) δ (ppm) 3.16 (broad, 2H), 3.44 (s, 3H), 4.95 (m, 2H), 5.22 (m, 2H), 5.92 (m, 1H).
$^{19}$F-NMR (376.2 MHz, solvent: CDCl$_3$, standard: CFCl$_3$) δ (ppm): −72.5 (m, 3F), −92.9 (m, 1F), −106.8 (m, 1F), −109.7 (m, 2F), −183.0 (m, 1F).

Preparation Example 2-1

Preparation of CF$_2$=CFCH$_2$C(C(O)OC(CH$_3$)$_3$)CH$_2$CH=CH$_2$

Into a 200 ml glass reactor, 91.8 g of CF$_2$ClCFClI and 0.75 g of BPO were charged and heated to 85° C. 30 g of CH$_2$=CHC(O)OC(CH$_3$)$_3$ was dropwise added thereto over a period of 0.5 hour, and after completion of the dropwise addition, the mixture was stirred at 85° C. for 7 hours. Distillation under reduced pressure was carried out to obtain 56 g of CF$_2$ClCFClCH$_2$CHI(C(O)OC(CH$_3$)$_3$) (80 to 85° C./0.2 Kpa).

Into a 1 L glass reactor, 50 g of the above prepared CF$_2$ClCFClCH$_2$CHI(C(O)OC(CH$_3$)$_3$) and 360 ml of dehydrated THF were charged and cooled to −75° C. 80 ml of a 1.6 M hexane solution of n-BuLi was dropwise added thereto over a period of 1.5 hours. The mixture was stirred at −75° C. for 1 hour, and then a solution having 22 g of allyl bromide diluted with 50 ml of THF was dropwise added thereto over a period of 1 hour. The mixture was further stirred for 3 hours, and then 200 ml of an aqueous saturated ammonium chloride solution was added thereto, and the temperature was increased to room temperature. The reaction solution was subjected to liquid separation, the resulting organic layer was concentrated by an evaporator, followed by distillation under reduced pressure to obtain 22 g of CF$_2$ClCFClCH$_2$C(C(O)OC(CH$_3$)$_3$)CH$_2$CH=CH$_2$ (70 to 75° C./0.2 kPa). Into a 200 ml glass reactor, 22 g of zinc and 80 g of water were charged and heated to 90° C. 22 g of the above prepared CF$_2$ClCFClCH$_2$C(C(O)OC(CH$_3$)$_3$)CH$_2$CH=CH$_2$ was dropwise added thereto, followed by stirring for 10 hours. The reaction solution was filtrated, and the obtained organic layer was distilled under reduced pressure to obtain 2.5 g of CF$_2$=CFCH$_2$C(C(O)OC(CH$_3$)$_3$)CH$_2$CH=CH$_2$ (50 to 55° C./0.8 kPa, hereinafter referred to as monomer 2-1).

NMR Spectra of the Monomer 2-1:
$^1$H-NMR (399.8 MHz, solvent: CDCl$_3$, standard: tetramethylsilane) δ (ppm): 1.37 (s, 9H), 2.39 (m, 5H), 5.02 (m, 2H), 5.65 (m, 1H).
$^{19}$F-NMR (376.2 MHz, solvent: CDCl$_3$, standard: CFCl$_3$) δ (ppm): −104.7 (dd, J=32.7, 85.0 Hz, 1F), −123.5 (m, 1F), −171.4 (m, 1F).

Preparation Example 2-2

Preparation of CF$_2$=CFCH$_2$C(C(O)O(2-MeAd))CH$_2$CH=CH$_2$

CF$_2$=CFCH$_2$C(C(O)O(2-MeAd))CH$_2$CH=CH$_2$ (monomer 2-2) can be obtained by using CH$_2$=CHC(O)O(2-MeAd) instead of CH$_2$=CHC(O)OC(CH$_3$)$_3$ in Preparation Example 2-1.

Preparation Example 3-1

Preparation of CF$_2$=CFCH$_2$CH(CH$_2$C(CF$_3$)$_2$OH)CH$_2$CH=CH$_2$

Into a 200 ml reactor made of glass, 118 g of CF$_2$ClCFClI and 1.1 g of AIBN were charged and heated to 75° C. 75.8 g of CH$_2$=CHCH$_2$C(CF$_3$)$_2$OCH$_2$OCH$_3$ was dropwise added thereto over a period of 1 hour, and after completion of the dropwise addition, the mixture was stirred at 75° C. for 7 hours. Then, distillation under reduced pressure was carried out to obtain 144 g of CF$_2$ClCFClCH$_2$CHI(CH$_2$C(CF$_3$)$_2$OCH$_2$OCH$_3$) (80 to 85° C./0.16 kPa).

Into a 2 L reactor made of glass, 144 g of the above prepared CF$_2$ClCFClCH$_2$CHI(CH$_2$C(CF$_3$)$_2$OCH$_2$OCH$_3$) and 550 ml of dehydrated THF were charge and cooled to −75° C. 220 ml of a 2M THF solution of CH$_2$=CHCH$_2$MgCl was dropwise added thereto over a period of 2 hours.

After the mixture was stirred at −75° C. for 3 hours, 400 ml of an aqueous saturated ammonium chloride solution was added thereto, and the temperature was increased to room temperature. The reaction solution was subjected to liquid separation, and the resulting organic layer was concentrated by an evaporator, followed by distillation under reduced pressure to obtain 66.3 g of CF$_2$ClCFClCH$_2$CH(CH$_2$C(CF$_3$)$_2$OCH$_2$OCH$_3$)CH$_2$CH=CH$_2$ (54 to 56° C./0.08 kPa).

Into a 500 ml reactor made of glass, 66.3 g of the above prepared CF$_2$ClCFClCH$_2$CH(CH$_2$C(CF$_3$)$_2$OCH$_2$OCH$_3$)CH$_2$CH=CH$_2$ and 200 ml of methanol were charged, and concentrated hydrochloric acid in a catalytic amount was added thereto, followed by heating at 60° C. for 19 hours. The reaction solution was cooled to room temperature, and 30 ml of water was added thereto, followed by liquid separation. The resulting organic liquid was further washed with 150 ml of water to obtain 63 g of a crude liquid. Then, into a 200 ml reactor made of glass, 30 g of zinc, 78 g of dioxane and 22 g of water were charged and heated to 85° C. 63 g of the above crude liquid was dropwise added thereto, followed by stirring for 24 hours. The reaction solution was filtrated, and diluted hydrochloric acid was added thereto, followed by liquid separation. The resulting organic layer was washed with a saturated salt solution, followed by distillation under reduced pressure to obtain 23.6 g of $CF_2$=$CFCH_2CH(CH_2C(CF_3)_2OH)CH_2CH$=$CH_2$ (54 to 56° C./0.5 kPa, hereinafter referred to as monomer 3-1).

NMR Spectra of the Monomer 3-1

$^1$H-NMR (399.8 MHz, solvent: $CDCl_3$, standard: tetramethylsilane) δ (ppm): 1.92 (m, 2H), 2.33 (m, 5H), 3.74 (br, 1H), 5.12 (m, 2H), 5.75 (m, 1H).

$^{19}$F-NMR (376.2 MHz, solvent: $CDCl_3$, standard: $CFCl_3$), δ (ppm): −77.3 (m, 3F), −77.8 (m, 3F), −92.9 (m, 1F), −104.2 (dd, J=32.24, 85.97 Hz, 1F), −123.5 (dd, J=85.97, 113.9 Hz, 1F), −171.9 (m, 1F).

Preparation Example 3-2

Preparation of $CF_2$=$CFCH_2CH(CH_2C(CF_3)_2OCH_2OCH_3)CH_2CH$=$CH_2$

Into a 200 ml glass reactor, 118 g of $CF_2ClCFClI$ and 1.1 g of AIBN were charged and heated to 75° C. 75.8 g of $CH_2$=$CHCH_2C(CF_3)_2OCH_2OCH_3$ was dropwise added thereto over a period of 1 hour, and after completion of the dropwise addition, the mixture was stirred at 75° C. for 7 hours. Distillation under reduced pressure was carried out to obtain 144 g of $CF_2ClCFClCH_2CHI(CH_2C(CF_3)_2OCH_2OCH_3)$ (80 to 85° C./0.16 kPa).

Into a 2 L glass reactor, 144 g of the above prepared $CF_2ClCFClCH_2CHI(CH_2C(CF_3)_2OCH_2OCH_3)$ and 550 ml of dehydrated THF were charged and cooled to −75° C. 220 ml of 2M-THF solution of $CH_2$=$CHCH_2MgCl$ was dropwise added thereto over a period of 2 hours.

After stirring was carried out at −75° C. for 3 hours, 400 ml of an aqueous saturated ammonium chloride solution was added, and the temperature was increased to room temperature. The reaction solution was subjected to liquid separation, and the resulting organic layer was concentrated by an evaporator, followed by distillation under reduced pressure to obtain 66.3 g of $CF_2ClCFClCH_2CH(CH_2C(CF_3)_2OCH_2OCH_3)$ (54 to 56° C./0.08 kPa). Into a 200 ml glass reactor, 30 g of zinc and 100 g of water were charged and heated to 85° C. 66.3 g of the above prepared $CF_2ClCFClCH_2CH(CH_2C(CF_3)_2OCH_2OCH_3)CH_2CH$=$CH_2$ was dropwise added thereto, followed by stirring for 24 hours. The reaction solution was filtrated and subjected to liquid separation, followed by distillation under reduced pressure to obtain 23.6 g of $CF_2$=$CF_2CH_2CH(CH_2C(CF_3)_2OCH_2OCH_3)CH_2CH$=$CH_2$ (54 to 56° C./0.5 kPa, hereinafter referred to as monomer 3-2).

NMR Spectra of the Monomer 3-2

$^1$H-NMR (399.8 MHz, solvent: $CDCl_3$, standard: tetramethylsilane) δ (ppm): 1.92 (m, 2H), 2.33 (m, 5H), 3.44 (s, 3H), 3.74 (br, 1H), 4.95 (m, 2H), 5.12 (m, 2H), 5.75 (m, 1H).

$^{19}$F-NMR (376.2 MHz, solvent; $CDCl_3$, standard: $CFCl_3$), δ (ppm): −77.3 (m, 3F), −77.8 (m, 3F), −92.9 (m, 1F), −104.2 (dd, J=33.24, 85.97 Hz, 1F), −123.5 (dd, J=85.97, 113.9 Hz, 1F), −171.9 (m, 1F).

Preparation Example 3-3

Preparation of $CF_2$=$CFCH_2CH(C(CF_3)_2OH)CH_2CH$=$CH_2$

Into a 1 L glass reactor, 500 g of $CF_2ClCFClI$, 344 g of $CH_2$=$CHC(CF_3)_2OH$ and 32.6 g of BPO were charged and heated at 95° C. for 71 hours. The obtained reaction crude liquid was distilled under reduced pressure to obtain 544 g of $CF_2ClCFClCH_2CHI(C(CF_3)_2OH)$ (55 to 58° C./0.2 kPa).

Into a 5 L glass reactor, 344 g of the above prepared $CF_2ClCFClCH_2CHI(C(CF_3)_2OH)$ and 1.7 L of dehydrated THF were charged and cooled to −70° C. 1.8 L of a 2M-THF solution of $CH_2$=$CHCH_2MgCl$ was dropwise added thereto over a period of 4 hours.

The temperature was increased to 0° C., followed by stirring for 16 hours, and then 1.6 L of an aqueous saturated ammonium chloride solution was added thereto, and the temperature was increased to room temperature. The reaction solution was subjected to liquid separation, and the resulting organic layer was concentrated by an evaporator, followed by distillation under reduced pressure to obtain 287 g of $CF_2ClCFClCH_2CH(C(CF_3)_2OH)CH_2CH$=$CH_2$ (62 to 66° C./0.2 kPa). Into a 1 L glass reactor, 97 g of zinc and 300 g of water were charged and heated to 90° C. 287 g of the above prepared $CF_2ClCFClCH_2CH(C(CF_3)_2OH)CH_2CH$=$CH_2$ was dropwise added thereto, followed by stirring for 24 hours. 70 ml of hydrochloric acid was dropwise added to the reaction solution, followed by stirring for 2 hours, and then filtration, liquid separation and distillation under reduced pressure were carried out to obtain 115 g of $CF_2$=$CFCH_2CH(C(CF_3)_2OH)CH_2CH$=$CH_2$ (53 to 54° C./1 kPa, hereinafter referred to as monomer 3-3).

NMR Spectra of the Monomer 3-3

$^1$H-NMR (399.8 MHz, solvent: $CDCl_3$, standard: tetramethylsilane) δ (ppm): 2.53 (m, 5H), 3.49 (m, 1H), 5.15 (m, 2H), 5.79 (m, 2H).

$^{19}$F-NMR (376.2 MHz, solvent; $CDCl_3$, standard: $CFCl_3$), δ (ppm): −73.6 (m, 6F), −104.1 (m, 1F), −123.1 (m, 1F), −175.4 (m, 1F).

Preparation Example 3-4

Preparation of $CF_2$=$CFCH_2CH(C(CF_3)_2OCH_2OCH_3)CH_2CH$=$CH_2$ $CF_2$=$CFCH_2CH(C(CF_3)_2OCH_2OCH_3)CH_2CH$=$CH_2$ (hereinafter referred to as monomer 3-4) can be obtained by using $CH_2$=$CHC(CF_3)_2OCH_2OCH_3$ instead of $CH_2$=$CHCH_2C(CF_3)_2OCH_2OCH_3$ in Preparation Example 3-2.

(Example for Preparation of Fluoropolymer (X))

Preparation Example 4

7.50 g of the monomer 1-1, 3.66 g of 1,4-dioxane and 16.6 g of methyl acetate were charged into a pressure resistant reactor made of glass having an internal capacity of 30 ml. Then, 0.22 g of polyfluorobenzoyl peroxide was added as a polymerization initiator. The interior of the system was freeze-deaerated and sealed, and polymerization was carried out for 18 hours in a constant temperature shaking vessel (70° C.). After the polymerization, the reaction solution was dropwise added into hexane, and the polymer was reprecipitated. Then, vacuum drying was carried out at 150° C. for 15 hours. As a result, 5.40 g of a white powdery non-crystalline polymer (X) having monomer units having a fluorinated alicyclic structure on its main chain was obtained.

The molecular weight of the fluoropolymer (X) was measured by means of GPC (THF solvent), whereby as calculated as polystyrene, the number average molecular weight (Mn) was 7,600, the weight average molecular weight (Mw) was 15,000, and the molecular weight distribution (Mw/Mn) was 1.99. The glass transition temperature as measured by differential scanning calorimetry (DSC) was 152° C.

(Example for Preparation of Fluoropolymer (A))

Example 1

3.74 g of the monomer 1-1, 1.0 g of the monomer 2-1 and 4.61 g of ethyl acetate were charged into a pressure resistant reactor made of glass having an internal capacity of 30 ml. Then, 0.14 g of PFBPO was added as a polymerization initiator. The interior of the system was freeze-deaerated and sealed, and polymerization was carried out for 18 hours in a constant temperature shaking vessel (70° C.). After the polymerization, the reaction solution was dropwise added into hexane, and the polymer was reprecipitated. Then, vacuum drying was carried out at 115° C. for 17 hours. As a result, 3.83 g of a non-crystalline polymer having a fluorinated cyclic structure on its main chain (hereinafter referred to as polymer (A1)) was obtained. As the molecular weight calculated as PSt measured by means of GPC employing THF as a solvent, the number average molecular weight (Mn) was 17,600, the weight average molecular weight (Mw) was 44,700, and Mw/Mn=2.54. Measurement by differential scanning calorimetry (DSC) was carried out, whereupon Tg was 139° C., and the polymer was a white powdery polymer at room temperature. The polymer composition calculated from the $^{19}$F-NMR and $^{1}$H-NMR measurements was such that repeating units derived from the monomer 1-1/repeating units derived from the monomer 2-1=74/26 mol %.

The obtained polymer was soluble in acetone, THF, ethyl acetate, methanol and 2-perfluorohexylethanol, and insoluble in perfluoro(2-butyltetrahydrofuran) and perfluoro-n-octane.

Example 2

In the same manner as in Example 1 except that the monomer 2-2 is employed instead of the monomer 2-1, a polymer (A2) having repeating units derived from the monomer 1-1/repeating units derived from the monomer 2-2 can be obtained.

Example 3

In the same manner as in Example 1 except that the monomer 1-2 is used in addition to the monomers 1-1 and 2-1 to carry out the polymerization, a polymer (A3) having repeating units derived from the monomer 1-1/repeating units derived from the monomer 1-2/repeating units derived from the monomer 2-1 can be obtained.

Example 4

Hydroxyl groups in the polymer (A1) obtained in Example 1 are converted into the form of a sodium salt with a 7.7 wt % methanol solution of sodium hydroxide, then the polymer is dissolved in dehydrated THF, and then $CH_2BrCOO(t-C_4H_9)$ is added and reacted to obtain a polymer (A4) wherein part of hydroxyl groups in the polymer (A1) are protected by $CH_2COO(t-C_4H_9)$ groups.

(Example for Preparation of Fluoropolymer (B))

Example 5

4.48 g of the monomer 3-1, 0.6 g of the monomer 2-1 and 7.63 g of ethyl acetate were charged in a pressure resistant reactor made of glass having an internal capacity of 30 ml. Then, 0.191 g of PFBPO was added thereto as a polymerization initiator. The interior of the system was freeze-deaerated and sealed, and then polymerization was carried out for 18 hours in a constant temperature shaking vessel (70° C.). After the polymerization, the reaction solution was dropwise added into hexane, and the polymer was reprecipitated. Then, vacuum drying was carried out at 100° C. for 17 hours. As a result, 4.01 g of a non-crystalline polymer having a fluorinated cyclic structure on its main chain (hereinafter referred to as polymer B1), was obtained. As the molecular weight calculated as PSt measured by means of GPC employing THF as a solvent, the number average molecular weight (Mn) was 10,700, the weight average molecular weight (Mw) was 20,500, and Mw/Mn=1.91. Measurement by differential scanning calorimetry (DSC) was carried out, whereupon Tg was 100° C., and the polymer was a white powdery polymer at room temperature. The polymer composition calculated from the $^{19}$F-NMR and $^{1}$H-NMR measurements was such that the repeating units derived from the monomer 3-1/repeating units derived from the monomer 2-1=81/19 mol %.

The obtained polymer was soluble in acetone, THF, ethyl acetate, methanol and 2-perfluorohexylethanol, and insoluble in perfluoro(2-butyltetrahydrofuran) and perfluoro-n-octane.

Example 6

In the same manner as in Example 5 except that the monomer 2-2 is employed instead of the monomer 2-1, a polymer (B2) having repeating units derived from the monomer 3-1/repeating units derived from the monomer 2-2 can be obtained.

Example 7

In the same manner as in Example 5 except that the monomer 3-2 is used in addition to the monomers 3-1 and 2-1 to carry out polymerization, a polymer (B3) having repeating units derived from the monomer 3-1/repeating units derived from the monomer 3-2/repeating units derived from the monomer 2-1 can be obtained.

Example 8

Hydroxyl groups in the polymer (B1) obtained in Example 5 are converted into the form of a sodium salt with a 7.7 wt % methanol solution of sodium hydroxide, then the polymer is dissolved in dehydrated THF, and then $CH_2BrCOO(t-C_4H_9)$ is added and reacted, to obtain a polymer (B4) wherein part of hydroxyl groups in the polymer (B1) are protected by $CH_2COO(t-C_4H_9)$ groups.

Example 9

1.5 g of the monomer 3-3, 0.4 g of the monomer 2-1, 0.10 g of ethyl acetate and 3.45 g of R225 were charged in a pressure resistant reactor made of glass having an internal capacity of 30 ml. Then, a solution having 0.075 g of PFB dissolved in 2.49 g of R225 was added as a polymerization initiator. The interior of the system was freeze-deaerated and sealed, and then polymerization was carried out for 18 hours in a constant temperature shaking vessel (20° C.). After completion of the polymerization, the reaction solution was diluted with R225, and dropwise added into hexane, and the polymer was reprecipitated. Then, vacuum drying was carried out at 100° C. for 20 hours. As a result, 1.75 g of a non-crystalline polymer having a fluorinated cyclic structure on its main chain (hereinafter referred to as polymer B5) was obtained. As the molecular weight calculated as PSt measured by means of GPC employing THF as a solvent, the number average molecular weight (Mn) was 13,300, the weight average molecular weight (Mw) was 25,600, and Mw/Mn=1.93. Measurement by differential scanning calorimetry (DSC) was carried out, whereupon Tg was 124° C., and the polymer was a white powdery polymer at room temperature. The polymer composition calculated from the $^{19}F$-NMR and $^1H$-NMR measurements, was such that repeating units derived from the monomer 3-3/repeating units derived from the monomer 2-1=72/28 mol %.

The obtained polymer was soluble in acetone, THF, ethyl acetate, methanol and 2-perfluorohexylethanol, and insoluble in perfluoro(2-butyltetrahydrofuran) and perfluoro-n-octane.

Example 10

In the same manner as in Example 9 except that the monomer 2-2 is employed instead of the monomer 2-1, a polymer (B6) having repeating units derived from the monomer 3-3/repeating units derived from the monomer 2-2 can be obtained.

Example 11

In the same manner as in Example 9 except that the monomer 3-4 is further used in addition to the monomers 3-3 and 2-1, a polymer (B7) having repeating units derived from the monomer 3-3/repeating units derived from the monomer 3-4/repeating units derived from the monomer 2-1 can be obtained.

Example 12

Hydroxyl groups in the polymer (B5) obtained in Example 9 are converted into the form of a sodium salt with a 7.7 wt % methanol solution of sodium hydroxide, then the polymer is dissolved in dehydrated THF, and then $CH_2BrCOO(t-C_4H_9)$ is added and reacted, to obtain a polymer (B8) wherein part of hydroxyl groups in the polymer (B5) are protected by $CH_2COO(t-C_4H_9)$ groups.

Examples 13 to 15

Evaluation of Transparency of Fluoropolymers

The absorption constant of each of the fluoropolymers (A1), (B1) and (B5) prepared in Examples 1, 5 and 9, to a laser beam having a wavelength of 157 nm, was calculated. As a result, the absorption constant of the polymer (A1) was 1.45/1 µm, the absorption constant of the polymer (B1) was 0.97/1 µm, and the absorption constant of the polymer (B5) was 1.02/µm.

It was confirmed from the above results that a resist film to be formed by using each of the fluoropolymers (A1), (B1) and (B5) of the present invention has a low absorption constant to a laser beam having a wavelength of 157 nm and thus exhibits adequate transparency as a single layer resist film.

Examples 16 to 18

Evaluation of Dry Etching Resistance

With respect to each of the fluoropolymers (A1), (B1) and (B5) prepared in Examples 1, 5 and 9, dry etching resistance was evaluated by obtaining the dry etching rate ratio. Under dry etching conditions assuming that a silicon nitride film is etched, the dry etching rate ratio of such a fluoropolymer and XP-2332C (manufactured by Shipley) as a KrF resist (etching rate of the fluoropolymer/etching rate of the KrF resist) was obtained.

The dry etching rate ratio was 1.56 in the case of the polymer (A1), 1.44 in the case of the polymer (B1), 1.50 in the case of the polymer (B5) and 2.00 in the case of the polymer (X), and the etching rate ratio is smaller in the case of each of the polymers (A1), (B1) and (B5) as compared with the polymer (X), and it was confirmed that the dry etching resistance improved.

Examples 19 to 21

0.7 g of each of the polymers (A1), (B1) and (B5) prepared in Examples 1, 5 and 9 and 0.035 g of triphenylsulfonium triflate were dissolved in 10 g of 2-heptanone, and the solution was filtrated by using a PTFE filter having a pore size of 0.2 µm to produce a resist composition.

The above resist composition was spin-coated on a silicon substrate treated with hexamethyldisilazane, followed by heat treatment at 100° C. for 90 seconds to form a resist film with a film thickness of 0.15 µm. The light transmittance of the resist film thus obtained is shown in Table 1.

TABLE 1

| | Fluoropolymer | Light transmittance at 193 nm (%) | Light transmittance at 157 nm (%) |
|---|---|---|---|
| Example 19 | A1 | 65 | 57 |
| Example 20 | B1 | 67 | 73 |
| Example 21 | B5 | 69 | 58 |

The fluoropolymer of the present invention is applicable, not only as a resist composition, but also to an ion exchange resin, an ion exchange membrane, a fuel cell, a cell material, an optical fiber, an electronic member, a transparent film material, a PVC film, an adhesive, a fiber material, a weather resistant coating, etc.

The entire disclosure of Japanese Patent Application No. 2004-118534 filed on Apr. 14, 2004 including specification, claims and summary is incorporated herein by reference in its entirety.

What is claimed is:

1. A fluoropolymer (A) having units derived from monomer units formed by cyclopolymerization of
   (I) at least one fluorinated diene selected from the group consisting of a fluorinated diene represented by the formula (1) and a fluorinated diene represented by the formula (2), and
   (II) units derived from monomer units formed by cyclopolymerization of a fluorinated diene represented by the formula (3):

$$CF_2=CFCF_2—C(CF_3)(OR^1)—CH_2CH=CH_2 \quad (1)$$

$$CF_2=CFCH_2—CH((CH_2)_nC(CF_3)_2(OR^1))—CH_2CH=CH_2 \quad (2)$$

$$CF_2=CFCH_2—CH(COOR^2)—CH_2CH=CH_2 \quad (3)$$

wherein $R^1$ represents a hydrogen atom, a blocked group of a hydroxyl group capable of being converted into a hydrogen atom by an acid, or a blocked carboxyl group-containing organic group capable of being converted into a carboxyl group-containing organic group by an acid, $R^2$ represents a hydrocarbon group having at most 20 carbon atoms, and n represents 0 or 1.

2. The fluoropolymer (A) according to claim 1, which has at least one type of a blocked acidic group selected from a blocked group of a hydroxyl group capable of being converted into a hydrogen atom by an acid, and a blocked carboxyl group-containing organic group capable of being converted into a carboxyl group-containing organic group by an acid.

3. The fluoropolymer (A) according to claim 2, which further has an acidic hydroxyl group.

4. The fluoropolymer (A) according to claim 1, wherein $R^1$ is at least one member selected from the group consisting of a hydrogen atom, an alkyl group having at most 15 carbon atoms, an alkoxymethyl group having at most 15 carbon atoms, an alkoxycarbonylmethyl group having at most 8 carbon atoms, and a tetrahydropyranyl group.

5. The fluoropolymer (A) according to claim 1, wherein $R^1$ is at least one member selected from the group consisting of a hydrogen atom, a methoxymethyl group, an ethoxymethyl group, a 2-cyclohexylcyclohexyloxymethyl group, a tert-butoxycarbonylmethyl group and a tetrahydropyranyl group.

6. The fluoropolymer (A) according to claim 1, wherein $R^2$ is at least one member selected from the group consisting of a tert-butyl group, a 1-ethylcyclopentyl-1-yl group, a 1-methylcyclohexyl-1-yl group and a 2-methyladamantyl-2-yl group.

7. A resist composition comprising the fluoropolymer (A) as defined in claim 1 which has a blocked acidic group, an acid-generating compound (B) which generates an acid under irradiation with light, and an organic solvent (C).

8. The fluoropolymer (A) according to claim 1, wherein $R^2$ is cycloalkyl group having at most 20 carbon atoms.

9. The fluropolymer (A) according to claim 1, wherein the ratio of the amount of monomers (1) and (2), based on the total amount of monomers (1), (2), and (3), is at least 50 mol %.

10. The fluropolymer (A) according to claim 1, wherein the ratio of the amount of monomers (1) and (2), based on the total amount of monomers (1), (2), and (3), ranges from 50 to 95 mol %.

11. The fluoropolymer (A) according to claim 1, wherein the ratio of the amount of monomer (3), based on the total amount of monomers (1), (2), and (3), is at least 5 mol %.

12. The fluropolymer (A) according to claim 1, which further comprises at least 30 mol % of another monomer (4) selected from the group consisting of an α-olefin, a fluorinated olefin, a fluorinated vinyl ether, a fluorinated cyclic monomer, a vinyl ester, a vinyl ether, a cyclic olefin, a crotonate, a cinnamate, maleic anhydride, vinyl chloride and styrene.

13. The fluropolymer (A) according to claim 1, which further comprises at least 15 mol % of another monomer (4) selected from the group consisting of an α-olefin, a fluorinated olefin, a fluorinated vinyl ether, a fluorinated cyclic monomer, a vinyl ester, a vinyl ether, a cyclic olefin, a crotonate, a cinnamate, maleic anhydride, vinyl chloride and styrene.

14. A resist composition comprising the fluoropolymer (A) as defined in claim 8 which has a blocked acidic group, an acid-generating compound (B) which generates an acid under irradiation with light, and an organic solvent (C).

15. A resist composition comprising the fluoropolymer (A) as defined in claim 9 which has a blocked acidic group, an acid-generating compound (B) which generates an acid under irradiation with light, and an organic solvent (C).

16. A resist composition comprising the fluoropolymer (A) as defined in claim 10 which has a blocked acidic group, an acid-generating compound (B) which generates an acid under irradiation with light, and an organic solvent (C).

17. A resist composition comprising the fluoropolymer (A) as defined in claim 11 which has a blocked acidic group, an acid-generating compound (B) which generates an acid under irradiation with light, and an organic solvent (C).

18. A resist composition comprising the fluoropolymer (A) as defined in claim 12 which has a blocked acidic group, an acid-generating compound (B) which generates an acid under irradiation with light, and an organic solvent (C).

19. A resist composition comprising the fluoropolymer (A) as defined in claim 13 which has a blocked acidic group, an acid-generating compound (B) which generates an acid under irradiation with light, and an organic solvent (C).

20. An ion exchange resin, an ion exchange membrane, a fuel cell, a cell material, an optical fiber, an electronic member, a transparent film material, a PVC film, an adhesive, a fiber material, a weather resistant coating, the improvement comprising:
   each of the ion exchange resin, the ion exchange membrane, the fuel cell, the cell material, the optical fiber, the electronic member, the transparent film material, the PVC film, the adhesive, the fiber material, the weather resistant coating comprises the fluropolymer (A) according to claim 1.

* * * * *